(12) United States Patent
Gawalkiewicz et al.

(10) Patent No.: US 7,331,699 B2
(45) Date of Patent: Feb. 19, 2008

(54) LIGHT SOURCE UNIT

(75) Inventors: Jerzy Gawalkiewicz, Mississauga (CA); John Joseph Kuta, Oakville (CA)

(73) Assignee: EXFO Photonics Solutions Inc., Mississauga (CA)

( * ) Notice: Subject to any disclaimer, the term of this patent is extended or adjusted under 35 U.S.C. 154(b) by 0 days.

(21) Appl. No.: 11/523,714

(22) Filed: Sep. 20, 2006

(65) Prior Publication Data

US 2007/0014117 A1 Jan. 18, 2007

Related U.S. Application Data

(62) Division of application No. 10/686,601, filed on Oct. 17, 2003, now Pat. No. 7,130,507.

(60) Provisional application No. 60/419,083, filed on Oct. 18, 2002.

(51) Int. Cl.
*F21V 7/04* (2006.01)
(52) U.S. Cl. ............. 362/648; 362/294; 362/306; 362/373
(58) Field of Classification Search ............ 362/648, 362/457, 458, 368, 285, 430, 572–575, 580, 362/582, 306, 294, 373, 293, 296, 362
See application file for complete search history.

(56) References Cited

U.S. PATENT DOCUMENTS

| | | | |
|---|---|---|---|
| 1,537,228 A | | 5/1925 | Gargan |
| 3,761,170 A | * | 9/1973 | Genesky et al. ............ 353/87 |
| 3,790,249 A | | 2/1974 | Treace |
| 4,290,097 A | * | 9/1981 | Block et al. ............ 362/264 |
| 4,320,439 A | * | 3/1982 | Wiley ............ 362/3 |
| 4,390,935 A | * | 6/1983 | Audesse et al. ............ 362/306 |
| 4,482,942 A | * | 11/1984 | Blaisdell et al. ............ 362/293 |
| 4,505,555 A | | 3/1985 | Piller et al. |
| 4,986,622 A | | 1/1991 | Martinez |
| 4,998,810 A | | 3/1991 | Sander et al. |
| 5,017,140 A | | 5/1991 | Ascher |
| 5,099,399 A | | 3/1992 | Miller et al. |
| 5,295,052 A | | 3/1994 | Chin et al. |
| 5,400,176 A | | 3/1995 | Dreessen et al. |
| 5,653,519 A | | 8/1997 | Dobbs |
| 5,664,864 A | | 9/1997 | Kuth |
| 5,761,356 A | | 6/1998 | Li |
| 5,838,860 A | | 11/1998 | Kingstone et al. |
| 5,961,203 A | | 10/1999 | Schuda |
| 6,027,237 A | | 2/2000 | Riser et al. |

(Continued)

*Primary Examiner*—Sandra O'Shea
*Assistant Examiner*—Gunyoung T. Lee
(74) *Attorney, Agent, or Firm*—Thomas Adams

(57) ABSTRACT

A light source unit comprises a support for supporting a lamp unit, e.g., a gas discharge lamp or the like. The lamp unit has longitudinal and transversal fiduciary surfaces and the support has guide rails for guiding the lamp unit as it is inserted transversely with the longitudinal fiduciary surfaces sliding along a reference surface until transversal fiduciary surfaces engage one or more stops. The support may comprise a first part for supporting the lamp unit, a second part for supporting a light guide, and at least first and second light baffles between the first part and the second part, the first and second baffles each having an aperture for passing only a portion of light from the lamp unit incident upon the baffle, the arrangement being such that light from the lamp unit must pass through the apertures in both baffles to be incident upon the light guide.

13 Claims, 7 Drawing Sheets

U.S. PATENT DOCUMENTS

| | | |
|---|---|---|
| 6,200,012 B1 | 3/2001 | Ouyang |
| 6,201,915 B1 | 3/2001 | Rizkin et al. |
| 6,217,205 B1 | 4/2001 | Ward |
| 6,382,824 B1 | 5/2002 | Prasad et al. |
| 6,398,367 B1 * | 6/2002 | Watanabe .................... 353/98 |
| 6,422,730 B1 | 7/2002 | Koren et al. |
| 6,799,871 B2 * | 10/2004 | Shin ........................... 362/362 |
| 7,130,507 B2 * | 10/2006 | Gawalkiewicz et al. ...... 385/39 |
| 2002/0048178 A1 | 4/2002 | Feinbloom et al. |

* cited by examiner

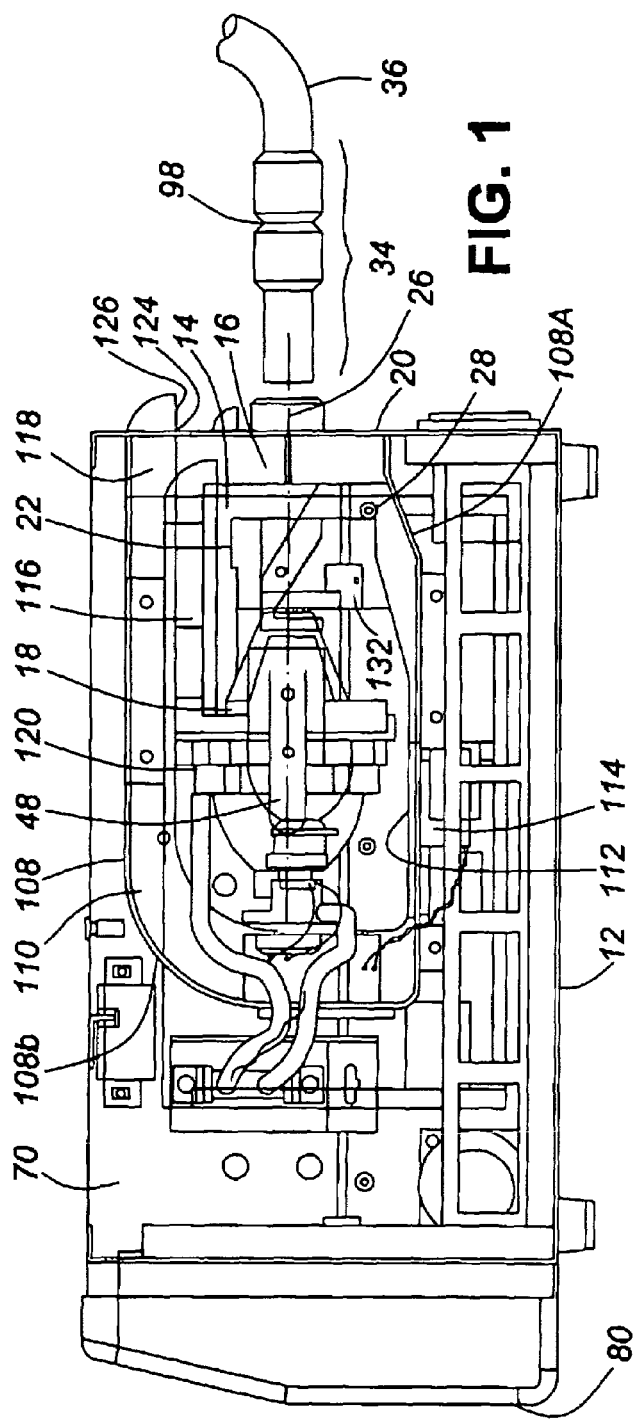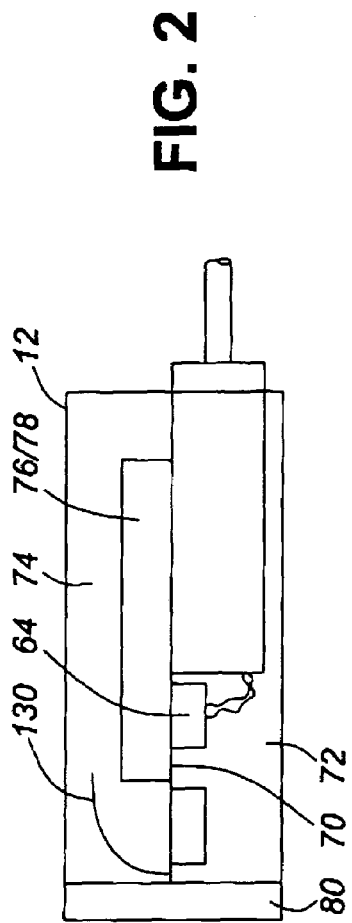

LIGHT SOURCE UNIT

CROSS-REFERENCE TO RELATED APPLICATIONS

This application is a divisional application of U.S. patent application Ser. No. 10/686,601 filed Oct. 17, 2003 now U.S. Pat. No. 7,130,507 and claims priority from U.S. Provisional patent application No. 60/419,083 filed Oct. 18, 2002. The entire contents of these two patent applications are incorporated herein by reference.

DESCRIPTION

1. Technical Field

This invention relates to light source units and is especially applicable to lamp mounting arrangements of light source units of the kind in which light from a light source, for example an arc-type gas discharge lamp or other high brightness light source that generates significant heat, is focussed onto a proximal end of a light guide and conveyed by the light guide to illuminate a target/position at its distal end.

2. Background Art

For a variety of reasons, it may be desirable to position a light source unit at a position remote from a target or position to be illuminated and convey the light to it by way of a light guide. The exact reason will depend upon the application, but may be the fact that the light source unit is a source of heat, noise and/or vibration, or is simply too bulky.

Typical applications include microscope illumination, lighting for surgical, medical and dental procedures, display device illumination, spot curing of adhesives and coatings, both in industrial applications and in dentistry, and so on. Typical light sources include incandescent lamps and gas discharge lamps, while typical light guides include glass optical fibers, plastic optical fibers, either individually or in bundles held together by metal ferrules, larger cross-section plastic waveguides, and liquid-filled light guides which are sealed at each end using optically transparent windows. Generally, liquid-filled light guides provide better transmission efficiencies than light guides comprising glass optical fibers, but the latter can tolerate higher temperatures, which is important if optical power must be maximized. In general, most applications require optical power to be maximized but design compromises must often be made with the selection of the light guide.

It is usually desirable for the light source, for example an arc-type gas discharge lamp, to be readily replaceable. It is also important, however, for the replacement lamp to be positioned and aligned very accurately so that the light is focussed at the correct position relative to the light guide. In known light source units, the lamps are so mounted that they must be inserted and removed longitudinally, which is not satisfactory where springs or clamps are provided to urge the lamp longitudinally to seat frontal fiduciary surfaces against a reference surface. Removal of the lamp longitudinally usually requires removal of the springs and, in some cases, partial disassembly of the light source unit.

Other known light source units, most notably some desktop projection systems (e.g., PLUS systems) provide for transverse insertion of the lamp via a lamp assembly. The lamp is mounted in a moulded plastic assembly. This combined lamp-plastic assembly forms a sub-assembly that is sold as a package. Lamp alignment is achieved by first aligning the lamp on the plastic assembly using fiducial surfaces. The sub-assembly is then aligned with the housing of the light source during the insertion of the sub-assembly into the housing via matching fiducial surfaces on the sub-assembly and the light source housing.

This technique is expensive, requiring the use of specialty materials if injection molded, or machined parts if made of metal.

It is also known to mount the lamp in a kind of drawer which can be withdrawn from the housing to enable replacement of the lamp. Such an arrangement is used in a light source marketed by the EXFO Photonic Solutions Inc. as model No. N2001-A1. These arrangements are not entirely satisfactory, however, because they tend to be complex and expensive to design and make.

U.S. Pat. No. 5,295,052 (Chin et al.) discloses a light source resiliently clamped in a pair of heat sinks which are mounted upon a phenolic plate which in turn is mounted on a bottom support plate which is accepted into rail slots of a bottom guide member to allow the entire assembly to be slid into and out of the housing for replacement of the lamp. This arrangement is not entirely satisfactory for similar reasons.

DISCLOSURE OF INVENTION

According to the present invention, there is provided a light source unit for use with a replaceable lamp unit comprising an elliptical reflector having a ceramic mounting ring attached to its rim, the ceramic mounting ring having frontal fiduciary surfaces precisely positioned longitudinally relative to a point light source of the lamp unit, and transverse fiduciary surfaces precisely positioned laterally relative to the point light source, wherein the light source unit comprises a lamp unit support having a reference surface to receive the ceramic mounting ring of a said lamp unit so that the ring extends around an opening in the lamp unit support, a pair of guide rails disposed one on each side of the opening, a pair of stops protruding axially from the reference surface between the guide rails at one end thereof, the stops being spaced apart and oriented so as to mate with a pair of the transverse fiduciary surfaces of the lamp unit, the guide rails being spaced from the reference surface so as to engage opposite sides of the ceramic ring of said lamp unit being inserted laterally therebetween but to provide clearance once the lamp unit has been fully inserted, the light source unit further comprising clamping means engageable, once the lamp unit has been fully inserted, to urge the lamp unit longitudinally to force its frontal fiduciary surfaces into contact with the reference surface and to urge the lamp unit laterally to force a pair of the transverse fiduciary surfaces against the stops.

Thus, the guiding rails do not contact the ceramic ring once the lamp is fully inserted. They prevent tilting of the lamp during insertion, providing protection for the light-generating, e.g., arc tube, portion of the lamp.

The frontal fiduciary surfaces may each extend around a part only of the ceramic mounting ring.

The clamping means may comprise a first spring clamp hingedly mounted to one side of the reference surface of the lamp unit support and pivotal between an open position allowing insertion of a leading edge of the ceramic ring between the guide rails and a closed position in which the clamp engages a trailing edge of the ceramic ring.

The clamping means may further comprise a generally U-shaped spring mounted to an opposite side of the reference surface of the lamp unit support and spaced therefrom so as to protrude generally parallel to the reference surface and engage an outer surface of the reflector to urge the lamp unit towards the reference surface.

The electronic-to-optical efficiency of a typical 100 W or 120 W gas-discharge lamp is perhaps in the range from 5% to 10%, so 90% to 95% of the electrical energy is converted to heat, which must be removed if the life of the lamp is not to be shortened unduly. Also, not all of the light from the light source enters the light guide and that which does not is converted to heat. Moreover, when light from such a light source is focussed at the proximal end of the light guide, it causes local heating, which may damage the light guide, especially if the light guide is of plastics material or liquid. Commercially available light guides can tolerate temperatures up to 60-65° C. used intermittently, or 50-55° C. in continuous use. Known fiber bundles can tolerate higher temperatures, perhaps as high as 70° C. for continuous use, provided the adhesives used have low optical absorption and a high temperature compatibility.

Known light source units employing various combinations of measures to avoid overheating of the light guide and other components are discussed at length in parent application Ser. No. 10/686,601 (supra).

In general, those know approaches introduce design complexity and cost, or sacrifice optical coupling efficiency. Introducing any element in the optical path leads to some level of losses. Further preferred embodiments of the present invention include features directed to these limitations.

Thus, the lamp unit support may support the lamp unit and a light guide in a prescribed alignment relative to each other. Thus, the lamp unit support may comprise a first part for supporting the lamp unit, a second part for supporting the light guide, and at least first and second light baffles between the first part and the second part, the first and second baffles each having an aperture for passing only a portion of light from the lamp unit incident upon the baffle, the arrangement being such that light from the lamp unit must pass through the apertures in both baffles to be incident upon the light guide.

The first and second parts of the support may comprise first and second flanges, the first flange supporting a light guide holder and the second flange having said reference surface for the lamp unit.

In preferred embodiments, the first and second baffles both are connected to the lamp unit support so as to provide a path of high thermal conductivity between each of their respective apertures and other parts of the lamp unit support.

Preferably, the lamp unit support comprises a higher portion extending between the first and second parts, and the first and second baffles are connected to the first and second parts, respectively.

Where the light guide comprises a waveguide and surrounding ferrule, the baffles preferably are dimensioned and positioned such that substantially none of the light from the lamp unit is incident upon the ferrule.

The aperture in the baffle that is closer to the first part of the support may be slightly larger than the aperture in the baffle that is further from the first part of the support.

Such an arrangement is advantageous when the lamp unit generates a focused beam. The aperture sizes may then be determined according to both the diameter of the light guide, and the smaller of the angular spread of the lamp unit beam and acceptance cone of the waveguide.

The closer baffle may comprise an end wall of a truncated conical baffle member mounted to the first flange with its mouth portion adjacent an opening in the lamp unit support. Such a conical baffle advantageously reduces the amount of light from the lamp unit that is incident upon the surrounding interior of the light guide unit, thereby reducing cooling requirements.

Preferably, the baffles, first flange and second flange are integral parts of the lamp unit support and are made of material having a high thermal conductivity.

The light source unit may comprise at least one fan for directing cooling air from outside the light source unit to cool both the lamp unit and the support.

A duct may be provided alongside a portion of the support for directing cooling air along the portion to cool the support. The duct may have an inlet adjacent the lamp unit support and an outlet for exhausting air exteriorly of a housing of the light source unit. An end portion of the duct may protrude outside the housing and the outlet open laterally of the end portion so as to direct air towards the light guide when connected to the light source unit.

The light source unit may have a housing partitioned to provide a separate compartment enclosing the lamp unit and the support, and at least one fan for directing cooling air from outside the housing onto the lamp unit light source conveniently via an opening communicating with the lamp unit compartment.

BRIEF DESCRIPTION OF THE DRAWINGS

An embodiment of the invention will now be described, by way of example only, with reference to the accompanying drawings in which:

FIG. 1 is a schematic plan view of a light source unit comprising a housing containing a lamp unit and having a port for connection of a light guide for conveying light from the lamp unit to a remote location;

FIG. 2 is a top view of the light source;

DETAILED DESCRIPTION OF PREFERRED EMBODIMENTS

Figure 3:
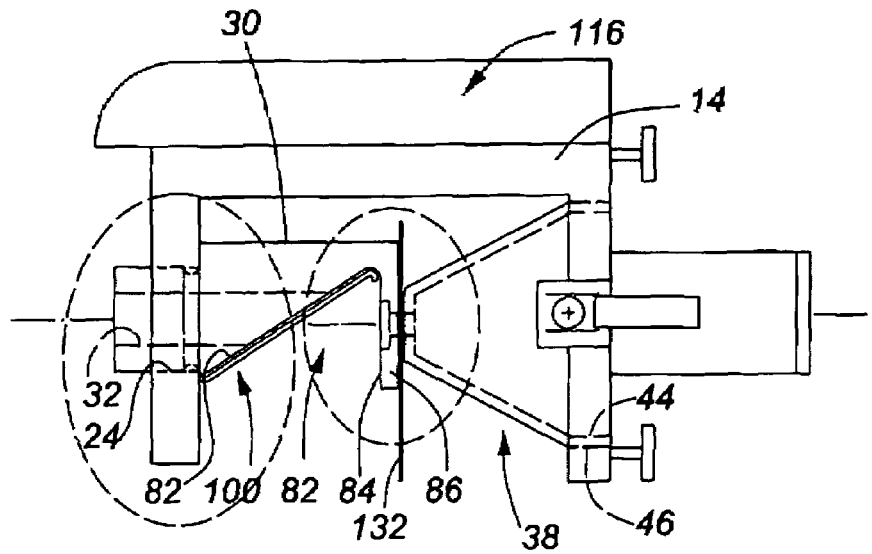
FIG. 3 is a schematic plan view of a support for the lamp unit and the port.

FIGS. 1 and 2 show a light source unit comprising a housing 12 with a side panel and a top panel removed to expose the components inside the housing 12. Referring also to FIG. 3, a generally C-shaped support 14 having spaced first and second flanges 16 and 18 is mounted in the housing 12 with the outermost surface of flange 16 secured to a rear wall 20 of the housing 12 so that a web portion 22 of the support 14 extends in cantilever fashion perpendicularly to the rear wall 20 and the other flange 18 depends from its distal end. A hole 24 (see FIG. 3) extending through the flange 16 registers with a hole in the rear wall 20 and a slot 26 (see FIG. 1) extends laterally from hole 24 to the edge of the flange 16. Screws 28 extend through clearance holes in the lower part of flange 16 to engage in screwthreaded holes in the upper part of flange 16 and serve to draw the two parts together. One end of a light guide holder 30 extends into hole 26 and is clamped therein by tightening of screws 28. The body of light guide holder 30 protrudes in cantilever fashion from an internal surface of flange 16. A cylindrical hole 32 through the portion of light guide holder 30 adjacent the flange 16 is sized to receive a ferrule 34 coupled to a light guide 36, shown detached in FIG. 1 to facilitate the description, and thus constitutes a light guide port. Where the light guide 36 is the liquid-filled type, the ferrule 34 will have a central transparent window for example of quartz, to receive incident light and convey it to the liquid-filled section of the light guide.

Figure 6:
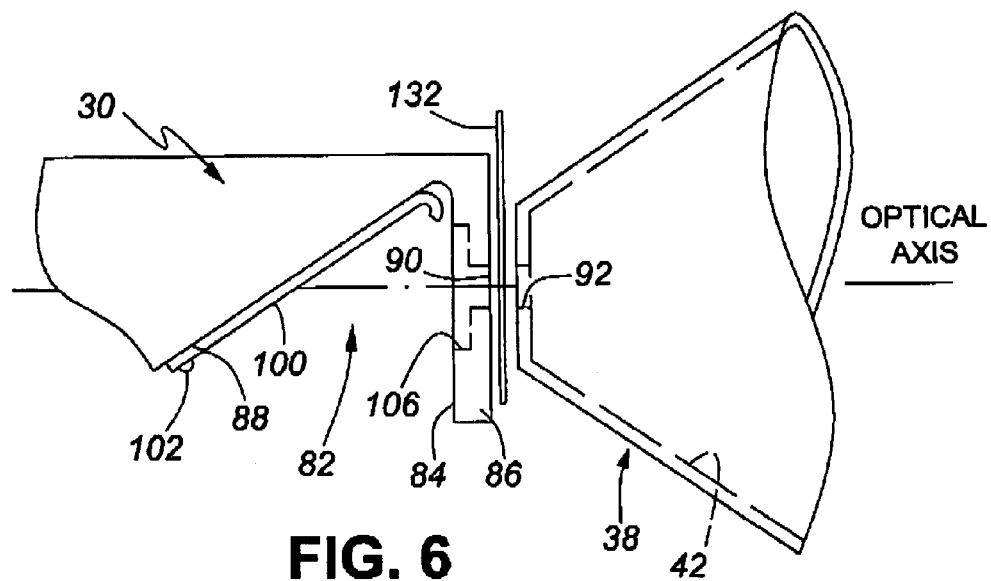
FIG. 6 is a detail side view of a portion of a light guide holder with an integral light baffle and a separate conical light baffle.

Referring also to FIG. 6, a conical light baffle 38 protrudes from the internal surface of flange 18 and is truncated by an end wall 40 adjacent the light guide holder 30. The conical baffle 38 is hollow, having a conical interior recess 42, and is attached to the flange 18 by its wider end portion 44 which a press-fit in a hole 46 in flange 18. The hole 46 is cylindrical and the wider portion 44 of conical baffle 38 also is cylindrical and has a diameter such that it is a press-fit in the hole 46.

A light source 48, specifically a lamp unit comprising a 120 W high-pressure metal-halide arc tube 50 (see FIG. 7) and an ellipsoidal reflector 52, is mounted onto the outer surface of flange 18. The maximum diameter of the reflector 52 is approximately equal to the diameter of the mouth of the conical baffle 38, so as to direct light into the conical baffle 38. The actual mounting arrangement will be described hereinafter.

Figure 7:
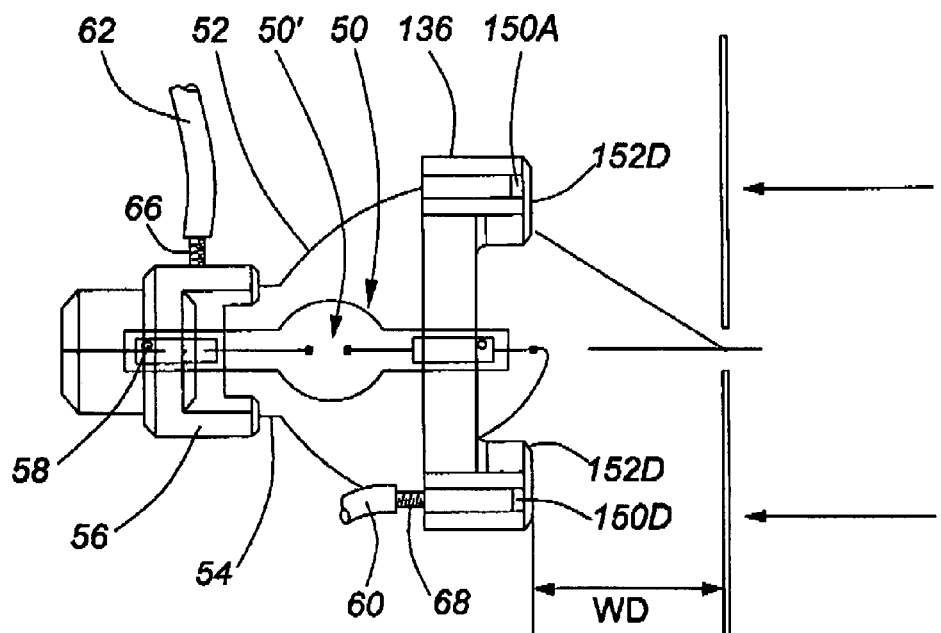
FIG. 7 is a side view of the lamp unit.

As shown in FIG. 7, the neck portion 54 of reflector 52 is secured to a ceramic base 56. One end of arc tube 50 is inserted into a ceramic base 56 and secured therein using ceramic cement. Power supply leads 60 and 62 from a connector bracket 64 (see FIGS. 1 and 2) mounted adjacent a front panel of the housing 12 are connected to rear and front terminals 66 and 68, respectively, of the arc tube 50.

Figure 12:
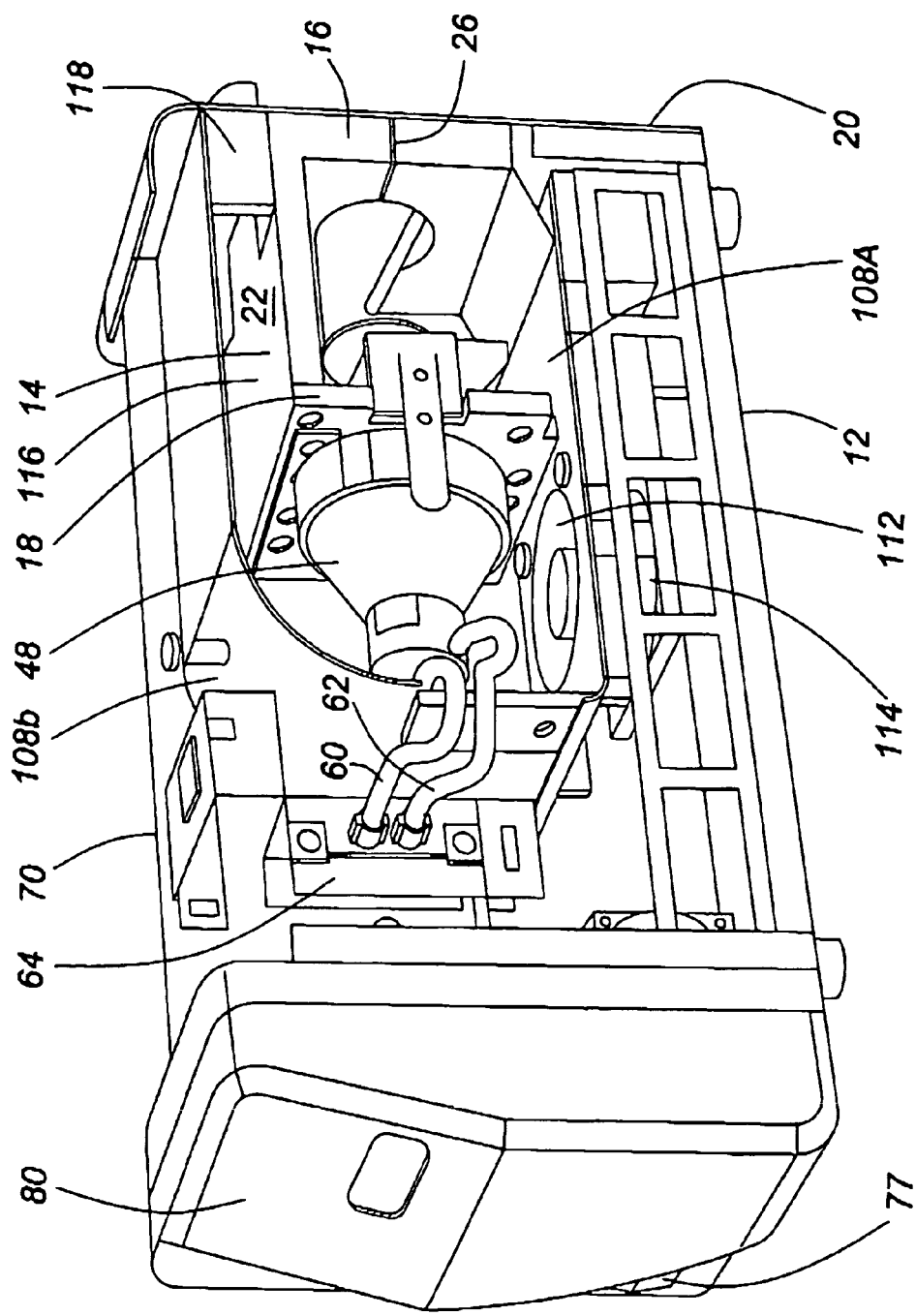
FIG. 12 is a perspective view of the lamp unit.

As can be seen from FIG. 2, a longitudinal dividing wall 70 separates the housing 12 into a first compartment 72 (visible in FIG. 1) and a second compartment 74, the latter housing a power supply unit 76 and a ballast unit 78 for arc tube 50. The connector block 64 is connected to the power supply unit 76 which is controlled by an on/off switch 77 (FIG. 12) on a front panel 80.

Figure 5:
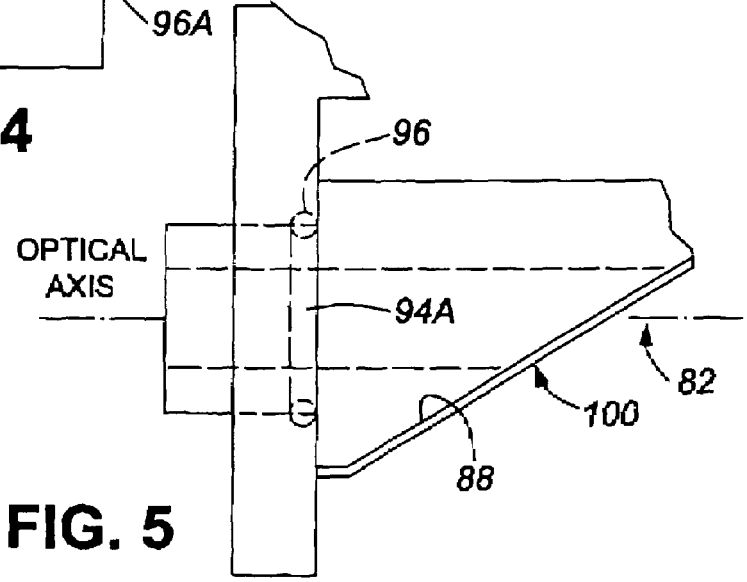
FIG. 5 is a side view of the port.

As can be seen more clearly in FIGS. 3, 5 and 6, the light guide holder 30 has a V-shaped notch 82 in one side. One wall 84 of the notch extends perpendicular to the optical axis for a major part of the diameter of the holder 30, leaving a flange 86, perpendicular to the optical axis, adjacent that end of the holder 30 juxtaposed to the conical baffle 38. The other, inclined wall 88 of the notch 82 extends inwardly from the opposite end of the holder 30 to meet the flange 86 at its innermost end. The flange 86 serves as a light baffle, having a small central aperture 90 to pass light to the light guide via a similar, but smaller, coaxial aperture 92 in the adjacent end wall 40 of the conical baffle 38.

Figure 4:
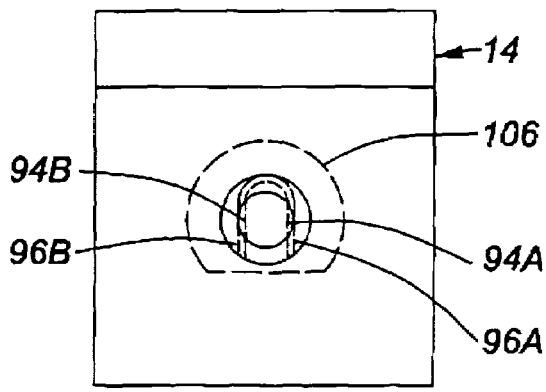
FIG. 4 is an end view of the port.

As shown in FIG. 4, the portion of the light guide holder 30 which surrounds the middle portion of the ferrule 34 has slots 94A and 94B which extend one each side of the hole 32 through the holder 30 and communicate with it. A U-shaped retaining spring 96 (see FIG. 5) has arms 96A and 96B extending in slots 94A and 94B, respectively. As shown in FIG. 1, the ferrule 34 has a circumferential groove 98. As the ferrule 34 is being inserted into the light guide port 32, it forces arms 96A and 96B apart. When it is fully inserted, the spring arms 96A and 96B engage in opposite sides of the groove 98 to retain the ferrule 34 and prevent its accidental removal. The ferrule 34 can be removed by applying sufficient axial force to flex the arms 96A and 96B apart and out of the groove 98.

The position of the groove 98 along the length of the ferrule 34 is such that, when the ferrule 34 is fully inserted, the spring arms 96A and 96B apply force to the ferrule 34 to urge it inwards so that its end is pressed against the end wall 86, which thus acts as a mechanical stop as well as a light baffle. Such an arrangement provides for consistent positioning of the end of the light guide and good thermal contact between the end of the ferrule 34 and the baffle 86.

The light guide holder 30 serves as both a heat sink and a heat conduit for heat generated in the light guide by the small amount of light which is incident upon the edge between the ferrule 34 and the window of the light guide, as well as by the small amount of optical radiation absorbed in the optical window. It should be appreciated that, although only a small amount of thermal energy is deposited directly into the light guide, its temperature can easily rise to beyond the maximum allowed since the ferrule 34 has a low thermal mass. Hence, it is important that an effective thermal bridge be provided between the light guide holder 30 and the light guide ferrule 34.

The light guide holder 30 has a metal safety shutter 100 in the form of a thin metal shim attached at one end, by screws 102, to the inclined wall 88. The shutter 100 is resilient, e.g. spring steel, so that, when the light guide ferrule 34 is removed, the shutter 100 lies flat against the inclined wall 88 and covers the inner end of hole 32 through the light guide holder 30 to prevent light exiting through the port. As the light guide ferrule 34 is inserted into the port 32, its end displaces the shutter 100 which flexes open. When the light guide ferrule 34 is fully inserted, the shutter 100 is fully open and allows light from the lamp 48 to enter the end of the ferrule 34 and hence enter the light guide 36.

The shutter 100 could, of course, be a rigid plate fastened by hinges and urged closed by one or more separate springs.

The cone axis CA of conical baffle 38 and the cylindrical axis LA of the light guide holder 30 are coincident and define an optical axis of the light source unit. The lengths of the holder 30 and the conical baffle 38 are such that a small gap 104 is left between the adjacent surfaces of the two baffles 40 and 86.

It should be noted that the apertures 90 and 92 in the holder light baffle 86 and the conical baffle end wall 40 are quite small. To reach the light guide, light from the lamp 48 must pass through both apertures 90 and 92, whose sizes and spacings are selected so that they substantially prevent light from impinging upon the ferrule 34, and heating it. As the light from the lamp 48 is focussed onto the light guide, it is converging, so the diameter of aperture 90 in the light guide baffle 86 is marginally smaller than the diameter of aperture 92 in the conical baffle end wall. Thus, any light which is not destined to enter the light guide is deemed spurious and is blocked by the baffles, and heat generated by the spurious light is conducted to other parts of the support 14.

The light guide holder 30, support 14, integrated baffle 86 and conical baffle end wall 40 are of metal having good conductivity, for example aluminum, so that heat generated by the light impinging upon the baffles 40 and 86 is conducted away from them, via the holder 30 and conical baffle 38, respectively, to the body of support 14 for dissipation. The support 14 and lamp 48 are cooled by directing cooling air onto them, as will be described later.

As can be seen from FIGS. 4 and 6, the integrated light baffle 86 also has a circular recess 106 to receive the end of the ferrule 34 as a close fit so as to center the light guide on the optical axis of the unit; it also provides a counter force transverse to the optical axis to that created by the displaced safety shutter spring 100.

The first compartment 72 is partitioned by a second dividing wall 108 to form a lamp compartment 110 containing the lamp 48, support 14, conical baffle 38 and light guide holder 30. The connector block 64 is mounted outside the lamp compartment 110. The dividing wall 108 has a first section 108A extends forwardly from a distal edge of flange 16 and generally parallel to the bottom of the housing 12, ending at a position between the lamp lead connector bracket 64 and the lamp 48 and a second portion 108B extending from that distal end of the first section 108A, curving around the lamp 48, and then extending generally parallel to the top of the housing 12, alongside, but spaced from, the web portion 22 of support 14. When the side panel of the housing 12 is attached, it abuts the edges of the dividing wall 108 to close off the lamp compartment 110.

A hole 112 is provided in dividing wall section 108A at a position adjacent the lamp 44 and a first fan 114 mounted to the dividing wall section 108A draws cooling air into housing 12 by way of vents (not shown) in the side panel(s) (not shown) and then blows it directly onto lamp 48 by way of hole 112. An exhaust duct 116, of generally rectangular cross-section, extends between the web portion 22 of the support 14 and the straight portion of dividing wall section 108B. The exhaust duct 116 has short sidewalls 118 extending between the dividing wall section 108B and the adjacent surface of support 14 but otherwise the exhaust duct is formed by the surface of support 14, the opposed portion of dividing wall section 108B, the adjacent section of longitudinal dividing wall 70 and the side panel.

The exhaust duct 116 has an intake opening 120 aligned with the surface of flange 18 and thus adjacent the lamp 48 to receive cooling air which has passed over the lamp 48. The curved portion of dividing wall section 108B helps to direct the air flow into the intake 120. A discharge end 122 of duct 116 protrudes through a hole 124 in the rear wall 20 of the housing 12 and has a lateral opening 126 facing towards the light guide port 32. Hence, in use, air leaving the exhaust duct 116 will be directed onto the protruding ferrule 34 to provide additional cooling. The interior of the duct 116 is black which, together with the lateral opening, reduces leakage of light and prevents direct viewing of the interior of lamp compartment.

It should be noted that cooling air passing through the exhaust duct 116 is in direct contact with the adjacent surface of the support 14 web portion 22, which is more efficient than would be the case if a duct wall were interposed.

If desired, an opening may be provided in the web portion 22, near the rear wall 20, to exhaust air from the vicinity of the light guide holder 30 directly.

A second fan 128, mounted adjacent the lamp lead connector bracket 64, also draws air into the housing 12 by way of the vents but directs the cooling air through a hole in longitudinal divides wall 70 into the second compartment 74 where a curved baffle 130 directs it onto the power supply unit 76 and the ballast unit 78.

The front panel 80 carries the usual display electronics, control switches, and so on, which are not shown or described in detail with a view to simplification. The multi-function support assembly is a particularly simple and efficacious approach to heat control. Typically, the end of the light guide comprises a quartz rod about 3 mm in diameter surrounded by a metal ferrule about 6 mm in diameter. If light were allowed to impinge upon the ferrule, it would cause heating, which would negate cooling of the ferrule and light guide by the cooling air. The two-stage light baffle arrangement (40, 86) progressively blocks heat by selectively passing light rays generated by the lamp 48 while keeping secondary sources of heat spatially removed from the entrance face of the light guide. Heat generated by the blocked light is conducted efficiently away from the light guide. Moreover, forcing the light guide ferrule against the light baffle 86 by means of the retaining/positioning spring 96 allows the baffle to serve as a heat sink. The conical baffle 38, which provides the first-stage light restriction, restricts the light drastically and so absorbs most heat, but can conduct it away and dissipate it efficiently because it is connected to web portion 22 by a path which has a relatively high thermal conductivity. The gap 104 between the two baffles 40 and 86 provides thermal insulation between conical baffle 40, where most of the heat will be generated, and baffle 86, which acts dually as a heat sink and heat conduit. Thus, heat generated in the baffles 40 and 86 is conducted to the web portion 22 which is actively cooled.

Advantageously, the conical baffle 38 also prevents extraneous light from impinging upon the surrounding housing and heating it up. The combination of the two light baffles 40 and 86 allows such precise control that it is possible to substantially avoid light impinging upon the ferrule 34 and heating it up.

Optionally, an aperture/shutter may be provided, as shown in FIGS. 1 and 6, in the form of a plate 132 mounted upon a rotatable rod 134 extending parallel to the optical axis and to one side of it so that the plate 132 protrudes into the gap 104. Rotation of the control rod, conveniently by a thumbwheel on the front panel, allows different sizes of aperture in plate 132 to be interposed between the apertures 90 and 92. The largest aperture in the plate could be oversized so that it provided no restriction at all. The remaining apertures could be progressively smaller so that, when interposed, they would each restrict the light to such an extent that the second aperture 90, in the light guide holder baffle 86, would be ineffective. The plate 132 could be used as a shutter by rotating it to interpose a portion of the plate having no aperture, thereby blocking light from reaching the aperture 92.

Advantageously, in embodiments of the present invention, the one, multi-function support 14, with its integral parts, not only supports both the light source 48 and the light guide holder 30 and positions and aligns them accurately relative to each other, but also provides heat shielding, heat diffusion and dissipation, and positioning and alignment of the variable aperture and shutter (where applicable), and even acts as an air baffle controlling air flow over the arc tube 50.

It will be appreciated that, because the apertures 90 and 92 in the baffles 86 and 40, respectively, have to be small in order to confine the light so precisely, and the light guide window, which constitutes an aperture to receive the light, also is small and must be accurately located in the focal plane of the lamp 48, the lamp 48 must be mounted very precisely both longitudinally and laterally so that the light is focussed precisely through the apertures 90 and 92 and onto the end of the light guide; yet it must be readily replaceable. These requirements are met by a novel and advantageous mounting arrangement which will now be described with reference to FIGS. 7 to 11.

The light source (lamp) 48 is accurately mounted relative to the support 14 by means of a series of reference or fiducial (locating) surfaces located on a frontal ceramic ring 136 of the lamp 48. These same reference or fiducial surfaces are used by the manufacturer during lamp assembly. As was described earlier with reference to FIG. 7, the elongate arc tube 50, which produces light by gas discharge, has one end cemented into a socket in the ceramic (rear) base 56, rear end terminal 58 of the arc tube 50 being connected to power supply lead terminal 66. The neck or narrower end 54 of reflector 52 is secured to the ceramic base 56 and its wider, rim portion is secured to the ceramic ring 136. The ceramic ring 136 has two diametrically-opposite notches 138 and 140 in its front surface, leaving two diametrically-opposite arcuate shoulder portions 142 and 144 each having such a length as to subtend an angle of about 90 degrees at the centre of the ring 136. Frontal fiduciary surfaces 146 and 148 of the shoulder portions 142 and 144, respectively, are coplanar and perpendicular to the optical axis, and serve as longitudinal locating surfaces. Thus, when the lamp 48 is mounted onto the support 14, as shown in FIG. 9, the frontal fiduciary surfaces 146 and 148 abut the outermost surface 174 of depending flange 18 of support 14 and establish the longitudinal position of the lamp 48, and hence the focal plane, relative to the light guide holder 30 and, indirectly, the end of the light guide, when installed.

Figure 8:
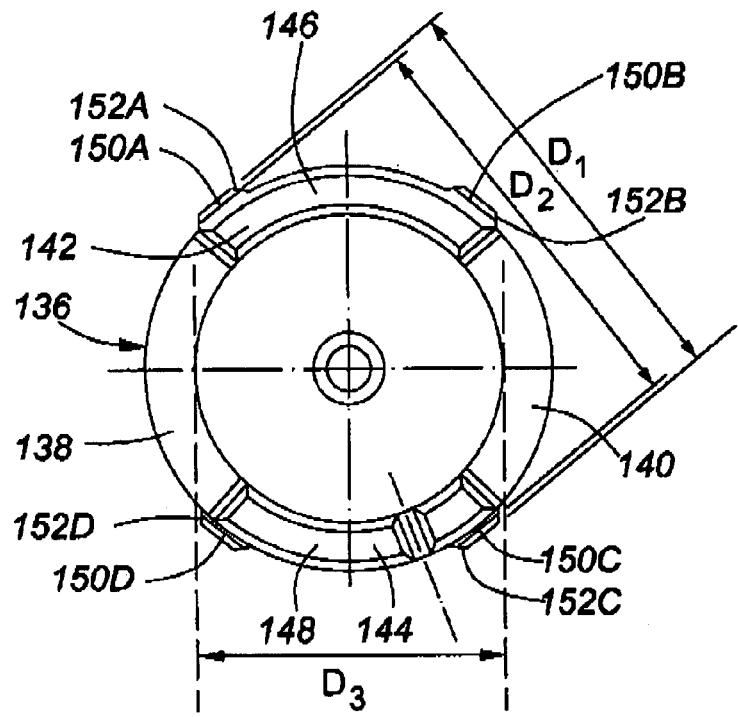
FIG. 8 is an end view of the lamp unit.

As can be seen more clearly in FIG. 8, the ceramic ring 136 also has four transverse locating surfaces 150A, 150B, 150C and 150D substantially equally spaced from each other about the circumference of the ceramic ring 136, and each at an end of one of the shoulder portions. In practice, only two of the transverse locating surfaces need be used to provide lateral alignment, as will be described later. The transverse locating surfaces 150A, 150B, 150C and 150D are outermost surfaces of four stepped pads 152A, 152B, 152C and 152D, respectively, which protrude radially from the circumferential surfaces of the shoulder portions of ceramic ring 136 and form a diameter D1. Surfaces 150A, 150B, 150C and 150D are at the same radial distance from the optical axis and, as shown in FIG. 8, diametrically spaced by a distance D1. Hence, pads 152A to 152D protrude slightly from the surface of ceramic ring 136 which has a diameter D2. The notches 138 and 140 between the shoulders allow cooling air to reach the arc tube 50 when in operation.

Figure 9:
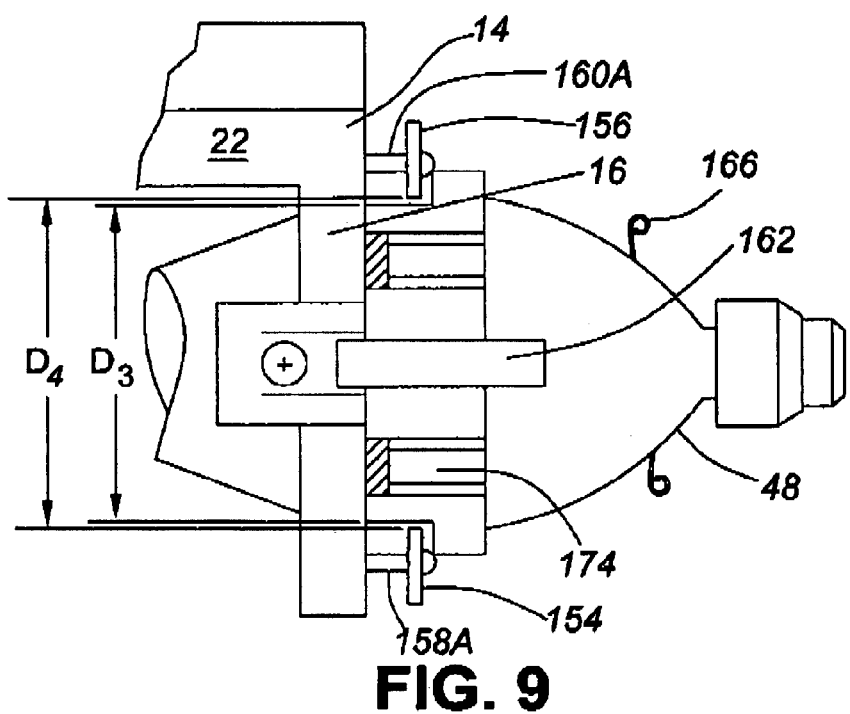
FIG. 9 is a detail side view of the lamp unit and its mounting.
Figure 10:
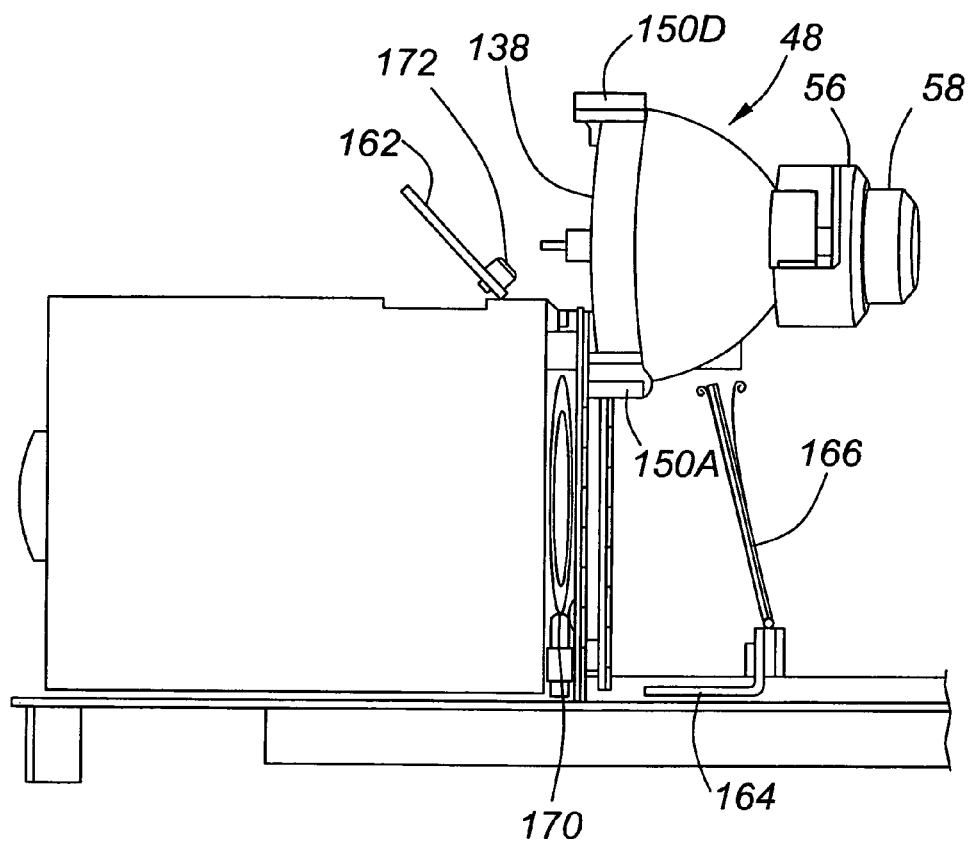
FIG. 10 is a detail top view of the mounting with the lamp unit partially installed.
Figure 11:
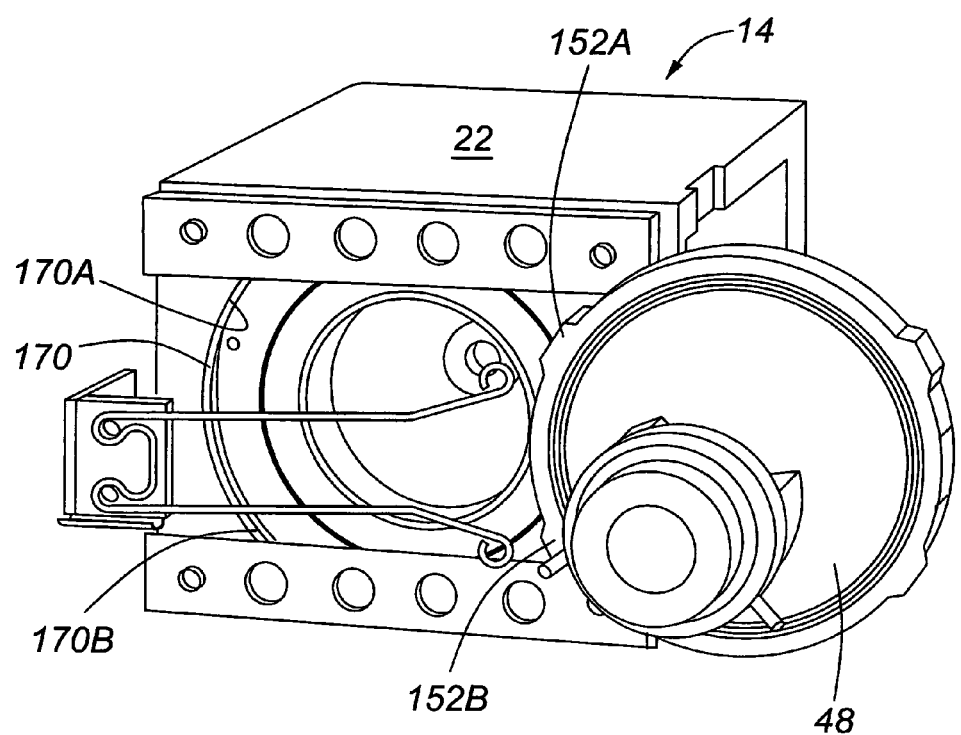
FIG. 11 is a perspective view of the lamp mounting.

Referring now to FIGS. 9, 10 and 11, a pair of guide rails 154 and 156 are attached to the outermost surface of support flange 18 to extend parallel to each other on opposite sides of the mouth of the conical baffle 38, each with the same spacing from the flange surface. Guide rail 154 is attached by posts 158A and 158B at its opposite ends and guide rail 156 is attached by posts 160A and 160B at its opposite ends.

As is shown also in FIG. 3, a spring retaining clip 162 secured to one side of the support flange 18 protrudes longitudinally into the adjacent opening between the ends of the guide rails 154 and 156. An elongate bracket 164 extends longitudinally from the opposite side of support flange 18 and carries at its distal end a U-shaped lamp retaining spring 166. The retaining clip 162 preferably is a "quick release" fastener of the kind in which the clip will remain in the "release" position when drawn back, which facilitates one-handed operation.

In order to install the lamp 48, the spring retaining clamp 162 is opened and the lamp 48 is slid laterally between the guide rails 154 and 156 with one of the shoulder portions between the rails. The shoulder portions of the ceramic ring 136 overhang the guide rails 154 and 156 slightly. As can be seen from FIG. 9, the spacing D4 between the respective innermost edges of the guide rails 154 and 156 is greater than the distance D3 (see also FIG. 8) between extremities of each of the shoulder portions but less than the diameter D2. When the lamp 48 is being inserted, initial contact is made between one of the longitudinal locating surfaces and the surface of flange 18 of support 14, as well as between the guide rails 154 and 156 and the notch surfaces.

The guide rails 154 and 156 serve to prevent the lamp from being inserted at a skew angle large enough to allow the arc tube 50 to strike the edge of the support 14, which could result in it being damaged. The outermost surfaces of the guide rails 154 and 156 are spaced from the flange 18 by a distance that is less than the distance by which the shoulder portions protrude beyond the bottoms of notches 138 and 140. This spacing ensures that, once the lamp 48 has been fully inserted, it does not rest on the guide rails 154 and 156.

The spacing between the guide rails 154 and 156 is such that the lamp 48 can be inserted with one of only two possible axial orientations (with respect to the optical axis). If it were necessary/desirable to reduce the number of possible orientations to one, a radial notch or hole 168 could be provided in the ceramic ring 136, as shown in FIG. 8, to receive a locating pin (not shown) installed on flange 18 in an appropriate position to mate with hole 168 when the lamp was fully inserted.

As the lamp 48 is being inserted, the arms of the U-shaped lamp spring 166 bear against the outer surface of the reflector 52 and provide a retaining force directed along the optical axis. When the lamp 48 is inserted a sufficient distance, the second longitudinal locating surface mates with the support 14, at which time the notch surfaces and guide rails lose contact. As the lamp 48 is inserted further, eventually the leading pairs of pads 152A, 152D of the ceramic ring abut a ledge on the surface of the flange at positions 170A and 170B, respectively.

The spring retaining clip 162 is then closed to hold the lamp 48 in place and urge it laterally to ensure positive engagement between the flange at positions 170A and 170B and the corresponding pads 152A and 152D, and thereby locate the lamp 48 accurately in the transverse direction, i.e., with the arc tube 50 centered on the optical axis. A stop 172 of Teflon (Trade Mark) is provided on the spring clip 162 to provide a slightly elastic contact between the spring clip 162 and the ceramic ring 136.

It should be noted that embodiments of the invention employing guide rails 154 and 156 to guide the lamp 48 during insertion, but which do not contribute to positioning of the lamp 48 once it has been installed, facilitate ease of insertion, lack of ambiguity for lamp orientation and protection for the arc tube 50 during insertion.

Removal of the lamp unit for replacement purposes simply involves releasing the spring clip 162 and sliding the lamp 48 transversely until it clears the guide rails 154 and 156. It has been demonstrated that a technician can replace the lamp in about 60 seconds, in contrast to the several minutes to hours taken to replace lamps in many known systems, especially those which have a large number of positioning controls (4-6 degrees of movement) such as are mounted directly onto a microscope.

Embodiments of the invention are especially suitable for microscope illumination systems because they use a short-arc light source, which is suitable for brightfield or darkfield illumination, or for fluorescent applications where the sample under examination is viewed using light emitted from a florescent sample excited by light from the light source unit. It should be appreciated, however, that light source units embodying this invention could be used for other applications, and could use other kinds of light sources, such as tungsten lamps.

It should be appreciated that, unlike the baffles disclosed in U.S. Pat. No. 6,027,237 (Riser et al), U.S. Pat. No. 6,200,012 (Ouyang), and U.S. Pat. No. 6,201,916 (Rizkin et al), the baffles employed in embodiments of the present invention are used as light baffles and passive cooling devices, and rely on thermal conduction of heat energy from the region of the end of the light guide to a remote heat sink.

It should also be appreciated that the lamp-mounting arrangement is not limited to use with light sources having the light baffle arrangement disclosed herein, or even to light sources used with light guides, but could be employed more generally, wherever such lamps are used.

An advantage of the baffle and heat control arrangement described hereinbefore is that it allows use of low temperature light guides such as liquid guides, with high intensity discharge lamps without exceeding temperature specifications for the light guide.

The invention claimed is:

1. A light source unit for use with a replaceable lamp unit comprising an elliptical reflector having a ceramic mounting ring attached to a rim thereof, the ceramic mounting ring having frontal fiduciary surfaces precisely positioned longitudinally relative to a point light source of the lamp unit, and transverse fiduciary surfaces precisely positioned laterally relative to the point light source, wherein the light source unit comprises a lamp unit support having a reference surface to receive the ceramic mounting ring of said lamp unit so that the ring extends around an opening in the lamp unit support, a pair of guide rails disposed one on each side of the opening, and stops protruding axially from the reference surface between the guide rails at one end thereof, the stops being spaced apart and oriented so as to mate with a pair of the transverse fiduciary surfaces of the lamp unit, the guide rails being spaced from the reference surface so as to engage opposite sides of the ceramic ring of the lamp unit being inserted laterally therebetween but to provide clearance once the lamp unit has been fully inserted, the light source unit further comprising clamping means engageable once the lamp unit has been fully inserted, to urge the lamp unit longitudinally to force frontal fiduciary surfaces of the ring into contact with the reference surface and to urge the lamp unit laterally to force a pair of the transverse fiduciary surfaces of the ring against the stops.

2. A light source unit according to claim 1, wherein the frontal fiduciary surfaces each extend around a part of the circumference of the ceramic mounting ring.

3. A light source unit according to claim 1, wherein the clamping means comprises a spring clamp hingedly mounted to one side of the reference surface of the lamp unit support and pivotal between an open position allowing insertion of a leading edge of the ceramic mounting ring between the guide rails and a closed position in which the clamp engages a trailing edge of the ceramic mounting ring.

4. A light source unit according to claim 3, wherein the clamping means further comprises a generally U-shaped spring mounted to an opposite side of the reference surface and spaced therefrom so as to protrude generally parallel to the reference surface and engage an outer surface of the reflector to urge the lamp unit towards the reference surface.

5. A light source unit according to claim 1, for supplying light via a light guide to a remote location, wherein the lamp unit support comprising a first part for supporting the lamp unit, a second part for supporting a light guide connected thereto, in use, and at least first and second light baffles between the first part and the second part, the first and second baffles each having an aperture for passing only a portion of light from the lamp unit incident upon the baffle, the arrangement being such that light from the lamp unit must pass through the apertures in both baffles to be incident upon the light guide.

6. A light source unit according to claim 5, for supplying light to a said light guide having at least one ferrule for coupling to the light source unit, wherein the baffles are dimensioned and positioned so as to substantially avoid light from the lamp unit being incident upon the ferrule when coupled thereto.

7. A light source unit according to claim 6, wherein the aperture in the baffle that is closer to the first part of the support is slightly larger than the aperture in the baffle that is further from the first part of the support.

8. A light source unit according to claim 7, wherein the first baffle comprises a truncating end wall of a conical baffle member having a mouth portion, amounting being provided at the mouth portion for mounting the lamp unit so as to direct light into the conical baffle member.

9. A light source unit according to claim 5, wherein the baffles, first part and second part are integral parts of the lamp unit support and are made of material having a high thermal conductivity, and a fan is provided for directing cooling air onto both the support and the lamp unit.

10. A light source unit according to claim 9, further comprising a duct for directing cooling air across a major surface of the lamp unit support.

11. A light source unit according to claim 9, wherein the light source unit has a housing partitioned to provide a compartment enclosing the lamp unit and support and the fan is positioned outside the compartment to direct cooling air onto the lamp unit via an opening in a wall of the compartment.

12. A light source unit according to claim 10, wherein the light source unit has a housing partitioned to provide a compartment enclosing the lamp unit and support and the fan is positioned outside the compartment to direct cooling air onto the lamp unit via an opening in a wall of the compartment.

13. A light source unit according to claim 5, further comprising a plate mounted between the first and second apertures and having a plurality of apertures of different sizes, the plate being pivotally mounted for interposing the plurality of apertures selectively between the first and second apertures, at least one of the apertures having a size such that, when interposed, it restricts light to such an extent that the second aperture is substantially ineffective.

* * * * *